US009062763B2

(12) United States Patent
Maloum

(10) Patent No.: US 9,062,763 B2
(45) Date of Patent: Jun. 23, 2015

(54) METHOD FOR SYNCHRONIZING A GEAR ON A GEARBOX SHAFT

(71) Applicant: RENAULT s.a.s., Boulogne-Billancourt (FR)

(72) Inventor: Abdelmalek Maloum, Chevilly Larue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/385,807

(22) PCT Filed: Mar. 19, 2013

(86) PCT No.: PCT/FR2013/050590
§ 371 (c)(1),
(2) Date: Sep. 17, 2014

(87) PCT Pub. No.: WO2013/150205
PCT Pub. Date: Oct. 10, 2013

(65) Prior Publication Data
US 2015/0051799 A1    Feb. 19, 2015

(30) Foreign Application Priority Data

Apr. 3, 2012  (FR) ..................................... 12 53053

(51) Int. Cl.
*G06F 7/00*      (2006.01)
*F16H 61/04*   (2006.01)
(Continued)

(52) U.S. Cl.
CPC .... *F16H 61/0437* (2013.01); *F16H 2061/0474* (2013.01); *F16H 61/0403* (2013.01);
(Continued)

(58) Field of Classification Search
CPC ..................... B60W 10/02; B60W 2510/0208; B60W 2510/0216; B60W 2510/0241; B60W 2510/025; B60W 2710/02; B60W 2710/021; B60W 2710/023; B60W 2710/025; B60W 2710/026; F16H 61/0403; F16H 2061/009; F16H 2061/0418; F16H 2061/0422; F16H 2061/0474; F16H 63/502; F16H 3/126; F16H 3/086; F16H 2200/0008; F16H 2200/0021; F16H 2200/0039

See application file for complete search history.

(56) References Cited

U.S. PATENT DOCUMENTS 5,803,869 A * 9/1998 Jamzadeh et al. ............ 477/168
(Continued)

FOREIGN PATENT DOCUMENTS

DE  10 2006 019 239 A1  10/2007
EP      2 138 371 A1    12/2009
FR      2 954 441 A1     6/2011

OTHER PUBLICATIONS

International Search Report issued Jun. 6, 2013, in PCT/FR2013/050590, filed Mar. 19, 2013.
(Continued)

*Primary Examiner* — David D Le
(74) *Attorney, Agent, or Firm* — Oblon, McClelland, Maier & Neustadt, L.L.P.

(57) ABSTRACT

A method for synchronizing a gear on a parallel-shafts vehicle gearbox shaft including at least one primary shaft connected to a power source, one secondary shaft driven by the primary shaft to transmit driving torque to wheels over plural transmission ratios, and at least one mechanism coupling a gear to its shaft to engage a transmission ratio without mechanical synchromesh members. The power source is made to operate to produce a signal commanding the reference torque ($T_1^{ref}$), equal to minimum torque that can be transmitted to minimize a discrepancy ($\omega_2 K - \omega_1$) between a primary speed ($\omega_1$) and a secondary speed ($\omega_2$) multiplied by a reduction ratio (K), when the relevant gear is coupled to its shaft, wherein the control signal is given by the sum ($K_w K \omega_2 - K_s \omega_1 + T_1^{int}$), in which ($T_1^{int}$) is a term derived by integrating the primary speed ($\omega_1$).

5 Claims, 4 Drawing Sheets

(51) Int. Cl.
*F16H 63/50* (2006.01)
*F16H 3/12* (2006.01)
*F16H 3/089* (2006.01)

(52) U.S. Cl.
CPC ............... *F16H63/502* (2013.01); *F16H 3/126* (2013.01); *F16H 2061/0422* (2013.01); *F16H 3/089* (2013.01); *F16H 2200/0008* (2013.01); *F16H 2200/0021* (2013.01); *F16H 2200/0039* (2013.01); *Y10S 903/945* (2013.01)

(56) References Cited

U.S. PATENT DOCUMENTS 7,373,233 B2 * 5/2008 Gianoglio et al. .............. 701/51
2006/0287794 A1 * 12/2006 Gianoglio et al. .............. 701/53
2008/0109142 A1 * 5/2008 Endo ............................... 701/54
2009/0233757 A1 * 9/2009 Soliman et al. .................... 477/3
2010/0113219 A1 * 5/2010 Corigliano et al. ........... 477/111
2012/0259494 A1 10/2012 Schaeffer et al.

OTHER PUBLICATIONS

French Preliminary Search Report issued Dec. 5, 2012, in Patent Application No. FR 1253053, filed Apr. 3, 2012 (with English Translation of Category of Cited Documents).

* cited by examiner

METHOD FOR SYNCHRONIZING A GEAR ON A GEARBOX SHAFT

BACKGROUND

The present invention relates to the field of the control of gear shifts in a gearbox.

More specifically, it relates to a method of synchronizing a gear on a parallel-shaft vehicle gearbox comprising at least one primary shaft connected to a power source, a secondary shaft driven by the primary shaft to transmit the motive torque to the wheels over several transmission ratios, and at least one means of coupling a gear to its shaft in order to engage a transmission ratio without mechanical synchronizing members.

This invention applies to any parallel-shaft transmission in which gear shifts with a break in transmission of torque are performed by moving a means of coupling between two transmission-ratio gears that are free to rotate on a shaft connected to the wheels of the vehicle.

It finds a nonlimiting application in a hybrid transmission for a motor vehicle provided with a combustion engine and with an electric drive machine, comprising two concentric primary shafts each one bearing at least one gear transmitting to a secondary shaft connected to the wheels of the vehicle and a first means of coupling between two primary shafts which can occupy three positions, in which positions: the combustion engine is uncoupled from the drive line connecting the electric machine to the wheels, it drives the wheels with or without top-up from the electric machine, or it is coupled to the electric machine so that their torque can be combined.

FIG. 1 describes a nonlimiting example of a hybrid transmission using this design principle. This transmission comprises a solid primary shaft 1 damping hub, connected directly by a filtration system (damper, double flywheel or the like) 2, to the inertia flywheel of a combustion engine (not depicted). The solid shaft 1 bears an idler gear 4 which can be connected therewith by a first coupling system 5 (dog clutch, synchromesh, or other type of progressive or non-progressive coupling). A hollow primary shaft 6 is connected to the rotor of an electric machine 7. The hollow shaft 6 bears two fixed gears 8, 9. It may be connected to the solid primary shaft 1 by the coupling system 5. A secondary shaft 10 bears two idler gears 11 and 12. The idler gears 11, 12 may be connected to the primary shaft by a second coupling system 13 (dog clutch, synchromesh, or other type of progressive or non-progressive coupling). The secondary shaft 10 also bears a fixed gear 14 and a gear 15 transmitting to a differential 16 connected to the wheels of the vehicle.

As mentioned earlier on, the first coupling means 5 can occupy at least three positions, in which positions:
 the combustion engine is uncoupled from the drive line connecting the electric machine 7 to the wheels (sliding gear in the middle as in FIGS. 1, 2 and 3),
 the combustion engine drives the wheels with or without top-up from the electric machine (sliding gear to the left), and
 the combustion engine and the electric machine 7 are both coupled so that their respective torques sent to the wheels are combined (sliding gear to the right).

In electric mode (cf. FIGS. 2 and 3), the electric machine drives the hollow primary shaft 6, while the solid shaft receives no torque from the combustion engine (position 1). The box has two electric transmission ratios referred to as "town" and "highway", in which the torque is transmitted from the secondary shaft 10 via the fixed gears 8 or 9. To shift from one of these two ratios to the other, the box has the second coupling system 13. In the absence of synchronizing rings, a system that uses a dog clutch to couple the sliding gear with the gears requires precise control by the electric machine over the primary speed in order to avoid jerks in the torque.

Publication FR 2 933 247 discloses a method for coupling a shaft of an electric machine with a wheel shaft for an electric or hybrid vehicle. The method described involves the following steps:
 the electric machine is fed a speed setpoint corresponding to the speed of the wheel shaft, disregarding the step-down ratio between the shaft of the electric machine and the wheel shaft,
 when the speed of the shaft of the electric machine reaches a calibratable threshold, a zero torque is applied to it and a mechanical synchronizing device is actuated so as to equalize the speed of the shaft of the electric machine with the speed of the shaft connected to the wheels, and
 as soon as the speed of the shaft of the electric machine is equal to the speed of the shaft connected to the wheels (disregarding the step-down ratio), dog-clutch engagement is performed.

With this method, the electric machine is made to operate first of all in order to reach a speed close, but not exactly equal, to that of the shaft connected to the wheels; a synchronizing device then completes the equalizing of the speeds between the two shafts, then final dog-clutch engagement of the transmission ratio is performed.

BRIEF SUMMARY

The present invention seeks to dispense with the mechanical synchronizer.

To this end, it proposes keeping the electric machine operating until the speeds of the shaft of the electric machine and of the shaft connected to the wheels are completely equalized, disregarding the step-down ratio.

To do so, the invention plans for the power source to be made to operate in such a way as to produce a reference torque control signal $T_1^{ref}$, reference torque equal to the minimum transmittable torque to minimize the discrepancy $\omega_2 K - \omega_1$ between the primary speed $\omega_1$ and the secondary speed $\omega_2$ multiplied by the reduction ratio (K) as the relevant gear is being coupled to its shaft.

For preference, the reference torque control signal $T_1^{ref}$ is controlled by feeding back a correction term into the discrepancy between the primary and secondary speeds $\omega_2 K - \omega_1$.

BRIEF DESCRIPTION OF THE DRAWINGS

The present invention will be better understood from reading the following description of one nonlimiting embodiment thereof, with reference to the attached drawings in which.

DETAILED DESCRIPTION

Figure 2:
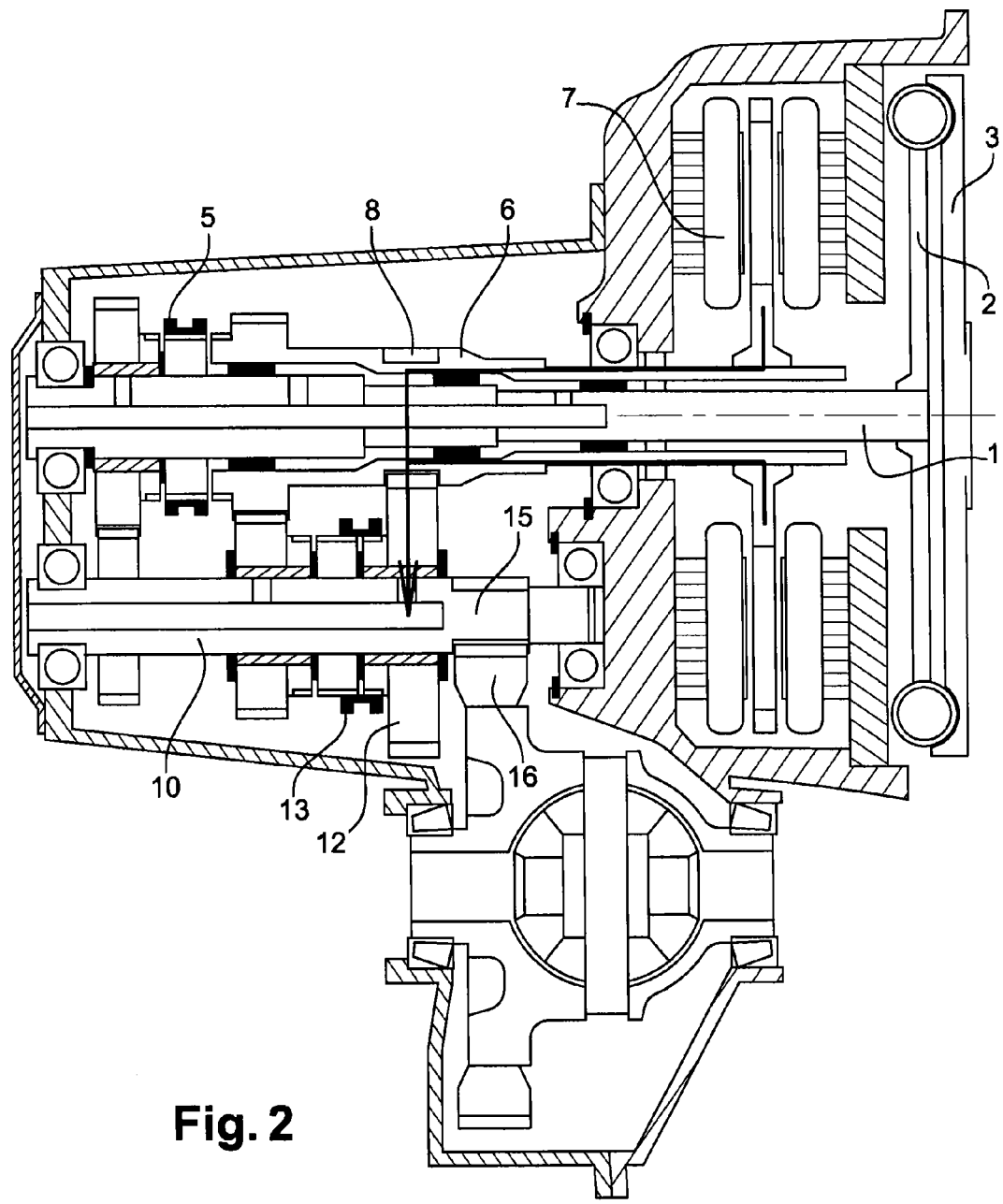

In FIG. 2, the first coupling system 5 is open, whereas the second coupling system 13 is closed to connect the idler gear of the short transmission ratio to the secondary shaft 10. The transmission is in electric mode in the short transmission ratio, or first forward-gear transmission ratio. The torque supplied by the electric machine to the hollow primary shaft 6 is transmitted via the first fixed gear 8 to the idler gear 12. The coupling system 13 rotationally connects the gear 12 and the shaft 10. The torque is transmitted from the secondary line to the differential 16 via the gear 15.

Figure 3:
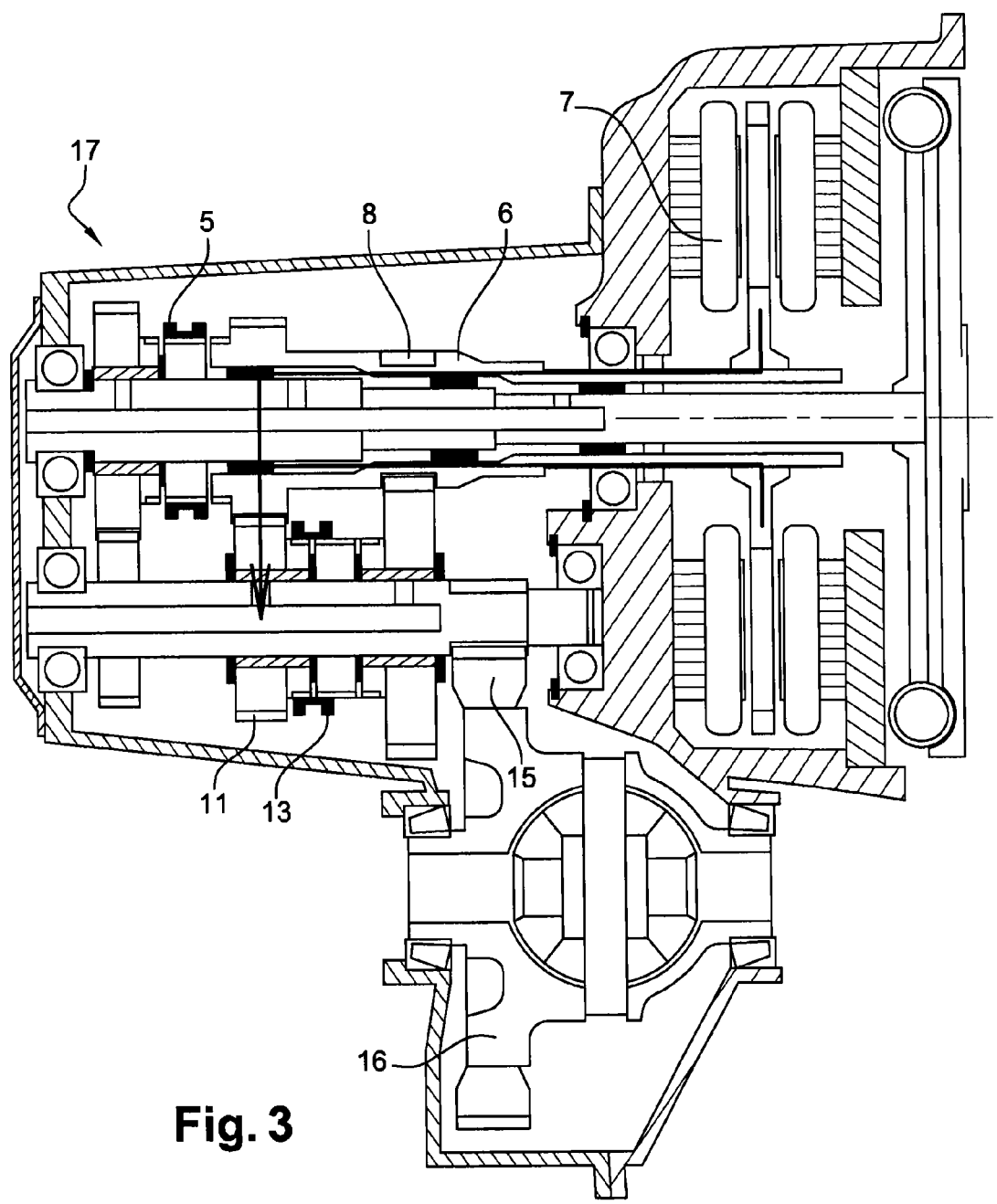

In FIG. 3, the first coupling system 5 is still open (position 1), whereas the second coupling system 13 is closed, so as to connect the idler gear of the intermediate transmission ratio 11 to the secondary shaft 10. The transmission is in electric mode in the intermediate transmission ratio or second forward-gear transmission ratio. The torque supplied by the electric machine 7 to the hollow primary shaft 6 is transmitted via the second fixed gear 9 to the idler gear 11. The coupling system 13 rotationally connects the gear 11 and the shaft 10. As in FIG. 2, the torque is transmitted from the secondary line to the differential 16 via the gear 15.

As indicated above, the problem encountered with this box is that of synchronizing the speeds of the two shafts 6 and 10 before beginning the phase of coupling the two shafts by dog-clutching the gears. When the coupler 5 is not provided with synchronizing rings. The matter is therefore that of synchronizing, without a mechanical synchronizing member, a gear on a parallel-shaft vehicle gearbox comprising at least one primary shaft connected to a power source, a secondary shaft driven by the primary shaft in order to engage a transmission ratio. This synchronization needs to be completely transparent to the driver, and take place with the torque demand continuing to be met. This problem arises in particular when shifting between the two electric transmission ratios, such shifts taking place with a break in torque through the dog-clutching of the gears 8 and 9 with the secondary shaft 10.

Figure 1:
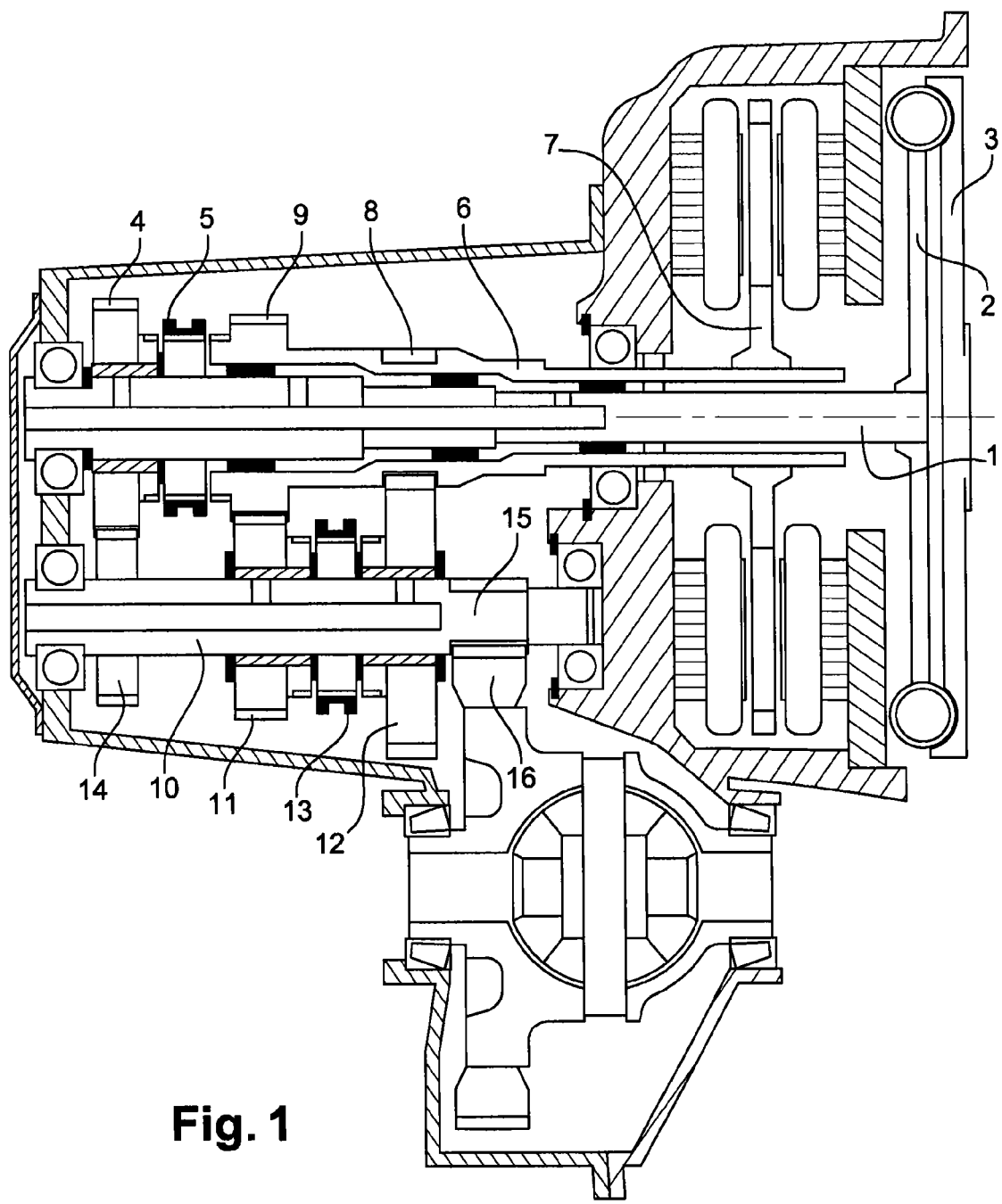
FIGS. 1, 2 and 3 show the drive line of a hybrid transmission in neutral and in its two electric gear ratios.

In the gearbox illustrated in FIGS. 1 to 3, $\omega_1$ is the speed of the shaft connected to the power source, namely the hollow primary shaft connected to the electric machine 7, and $\omega_2$ is the speed of the shaft connected to the wheels, namely the secondary shaft 10.

Assuming that, in the initial state, the two shafts are completely uncoupled, and applying the fundamental principle of mechanics, the following dynamic model is obtained:

for the primary shaft: $J_1\dot\omega_1 = T_1 + T_{d1}$, and for the secondary shaft: $J_2\dot\omega_2 = T_{d2}$, which equations are fundamental equations of dynamics in which $J_1$ is the inertia with respect to the primary shaft, $J_2$ the inertia with respect to the secondary shaft, and $Td_1$ and $Td_2$ are the resistive torques on these shafts, which are unknown exogenic inputs.

Figure 4:
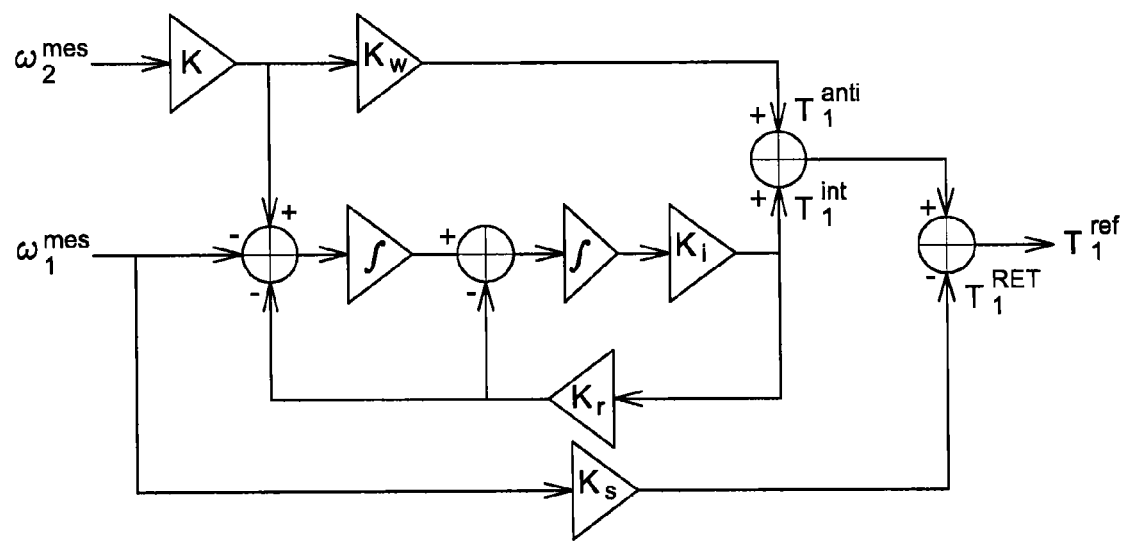
FIG. 4 illustrates the proposed operation.

The calculation in FIG. 4 is aimed at producing a control signal that allows the speeds $\omega_2$ and $\omega_1$ to be synchronized, namely that creates the condition $\omega_2^{mes}K = \omega_1^{mes}$, where K is the reduction ratio between the power source and the secondary shaft, so that the conditions of perfect coupling between the sliding gear and the gears can be met.

The result of this calculation is a reference torque control signal "$T_1^{ref}$" for the electric machine 7, which allows the speed $\omega_1$ of the primary shaft 6 to be synchronized with the speed $\omega_2$ of the secondary shaft 10, disregarding the step-down ratio K.

According to the invention, the power source is therefore made to operate in such a way as to produce the reference torque control signal $T_1^{ref}$, which torque is equal to the minimum transmittable torque, in order to minimize the discrepancy $\omega_2K - \omega_1$ between the primary speed $\omega_1$ and the secondary speed $\omega_2$ multiplied by the reduction ratio K, as the relevant gear is being coupled to its shaft.

In order to produce the reference signal "$T_1^{ref}$", it is necessary first of all to multiply the speed $\omega_2^{mes}$ measured on the secondary shaft 10 by a first gain K which is the reduction ratio between the power source and the secondary shaft 10, so that this can be compared against the measured speed $\omega_1^{mes}$ of the primary shaft 6. Integrating the discrepancy between the speeds $\omega_2K - \omega_1$ twice and multiplying it by a gain Ki, gives an "integral action $T_1^{int}$". The product $\omega_2^{mes}.K_w$ provides an anticipation value "$T_1^{anti}$". The primary speed $\omega_1^{mes}$ is multiplied by a third gain $K_s$ to provide a state feedback "$T_1^{ret}$". The signals generated by the integral action "$T_1^{int}$", the anticipation "$T_1^{anti}$" and the state feedback "$T_1^{ret}$" are summed. One original feature of this device lies in the feeding-back of "$K_r.T_1^{int}$" into the speeds comparison term. The reference torque control signal ($T_1^{ref}$) is thus controlled by feeding back a corrective term into the discrepancy between the primary and secondary speeds ($\omega_2K - \omega_1$). The corrective term correcting the discrepancy in the speeds $\omega_2K - \omega_1$ is proportional to $T_1^{int}$. This feedback loop guarantees that when the speeds are synchronized, namely when $\omega_2^{mes}K = \omega_1^{mes}$, the torque $T_1^{ref}$ is the minimum that can be transmitted in order to achieve that, even when the secondary speed varies, namely when:

$$\frac{d\omega_2^{mes}}{dt} \neq 0.$$

The torque control signal "$T_1^{ref}$" for the electric machine, which is the result of the calculation of FIG. 4, is based on the sum $K_w.K.\omega_2 - K_s.\omega_1 + T_1^{int}$, where $K_w$ and $K_s$ are constants. It is given by the sum $K_w.K.\omega_2 - K_s.\omega_1 + T_1^{int}$, where $T_1^{int}$ is an integration term of the primary speed $\omega_1$. Taking the resistive torques $T_{d1}$ and $T_{d2}$ into consideration, it is possible to write:

$$J_1 \frac{d\omega_1}{dt} = K_w K\omega_2 - K_s\omega_1 + T_1^{int} + T_{d1}$$

$$J_2 \frac{d\omega_2}{dt} = T_{d2}$$

and FIG. 4 yields:

$$\frac{d^2 T_1^{int}}{dt^2} + K_i K_r \left( \frac{dT_1^{int}}{dt} + T_1^{int} \right) = K_i(K\omega_2 - \omega_1)$$

The constants $K_w$ and $K_s$ are fixed in such a way as to ensure the stability of the reference torque signal $T_1^{ref}$. In order to calculate the gains $K_r$, $K_s$, $K_w$, and $K_i$, the overall stability conditions required for the control signal and those from the specifications, namely the response time (time needed for the speed $\omega_1$ to reach 95% of $K\omega_2$) and overshoot (max value in excess of the value $K\omega_2$) need to be set.

In conclusion, the strategy implemented by the invention makes it possible to minimize the torque at the coupler during the phase of coupling following synchronization. The speed discrepancy decreases very rapidly to reach a value of around 30 revolutions per minute, which allows coupling to be performed smoothly. The method thus allows the next phase of coupling the two shafts to be made as transparent as possible as far as the user is concerned, despite the resumption of torque, namely as smoothly as possible. It notably allows control over paths of a sloping nature, which correspond to the unfavorable cases of heavy braking. Finally, because there are no longer any abrupt take-ups of torque, wear on the mechanical parts of the coupling system is limited.

The invention claimed is:

1. A method of synchronizing a gear on a parallel-shaft vehicle gearbox including at least one primary shaft connected to a power source, a secondary shaft driven by the primary shaft to transmit motive torque to wheels over plural transmission ratios, and at least one means of coupling a gear to its shaft to engage a transmission ratio without mechanical synchronizing members, the method comprising:

making the power source operate to produce a reference torque control signal $T_1^{ref}$, which reference torque is equal to a minimum transmittable torque to minimize a discrepancy $\omega_2 K - \omega_1$ between a primary speed $\omega_1$ and a secondary speed $\omega_2$ multiplied by a reduction ratio K as a relevant gear is being coupled to its shaft, wherein the control signal is given by sum $$K_w K \omega_2 - K_s \omega_1 + T_1^{int},$$

in which $T_1^{int}$ is an integration term of the primary speed $\omega_1$.

2. The synchronizing method as claimed in claim 1, wherein the reference torque control signal $T_1^{ref}$ is controlled by feeding back a correction term into the discrepancy between the primary and secondary speeds $\omega_2 K - \omega_1$.

3. The synchronizing method as claimed in claim 2, wherein the control signal is based on the sum $K_w K \omega_2 - K_s \omega_1 + T_1^{int}$, in which $K_w$ and $K_s$ are constants.

4. The synchronizing method as claimed in claim 3, wherein the constants $K_w$ and $K_s$ are fixed to ensure stability of the reference torque signal $K_1^{ref}$.

5. The synchronizing method as claimed in claim 2, wherein the correction term for correcting the speeds discrepancy $\omega_2 K - \omega_1$ is proportional to $T_1^{int}$.

* * * * *